Figure 1:
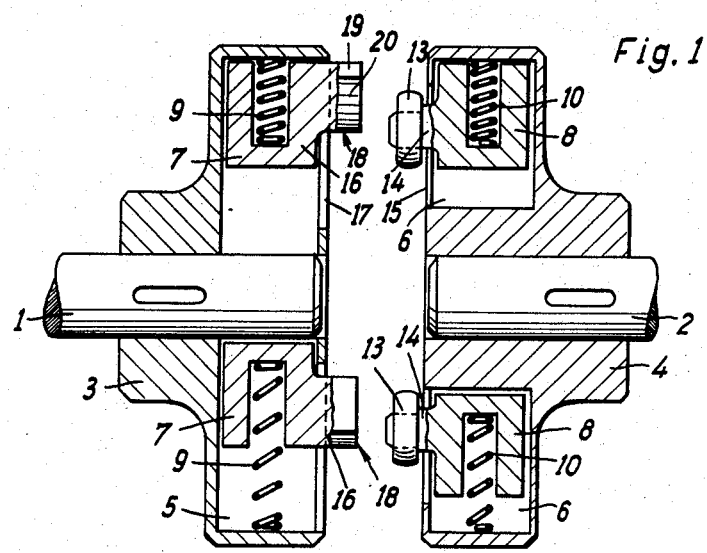

Aug. 9, 1960

K. SCHILD 2,948,373

OVERLOAD RELEASING CLUTCH

Filed June 23, 1958

2 Sheets-Sheet 1

Inventor:
KARL SCHILD

Aug. 9, 1960  K. SCHILD  2,948,373
OVERLOAD RELEASING CLUTCH
Filed June 23, 1958 2 Sheets-Sheet 2

Inventor:
KARL SCHILD

United States Patent Office 2,948,373
Patented Aug. 9, 1960

2,948,373

OVERLOAD RELEASING CLUTCH

Karl Schild, Munich, Germany, assignor to Ortwin Stieber, Munich, Germany

Filed June 23, 1958, Ser. No. 743,833

Claims priority, application Germany June 25, 1957

7 Claims. (Cl. 192—56)

The present invention is related to an overload releasing clutch between opposite facing ends of a driving rotating shaft and a driven rotating shaft or other rotating machine elements.

More particularly, the invention relates to an overload releasing clutch composed of two opposed coupling halves, each mounted to rotate coaxially with the other, in which the coupling halves are provided with opposed engaging members.

In coupling devices of this nature, the engaging connection between the coupling halves may be interrupted by providing engaging members therebetween which are designed to fracture and release the connection when the permissible torque is surpassed. Necessarily, the fractured engaging elements must be replaced after every release caused by a torque overload. Thus, there will be an undesired stand-by period while the elements are replaced.

Alternatively, the engaging connection between the coupling halves may be interrupted by providing an adjustable built-in friction clutch which will automatically release either partially or entirely when the permissible torque is surpassed. However, friction clutches are susceptible to wear and overheating to such an extent that they will fail upon extended use, causing damage to themselves and possibly to adjacent machine parts, thus resulting in expensive shutdowns. It is true that by means of suitable auxiliary equipment, such as heat feelers or heat sensitive elements including contactors and the like, the destruction of the friction clutch may be prevented, but such auxiliary equipment is generally too complicated and expensive in both construction and maintenance.

Safety couplings have already been proposed in which radially movable, spring-loaded engaging fingers in the one coupling half and rigidly arranged or fastened engaging fingers in the other coupling half are in drivable engaging connection in a radial direction. When overloaded, disengagement is affected by the sliding of the spring-loaded engaging fingers out of engaging relationship with the rigid engaging fingers. The engaging surfaces on the engaging fingers have been so arranged that they extend obliquely in the peripheral direction of the rotating coupling halves. Such a design requires additional retaining elements for the movable engaging members in their inoperative position for the reduction or suppression of the friction between the cooperating engaging members. These elements in their turn must be disengaged after each releasing due to an overload. Moreover, they will render the coupling very complicated in structure and operation. A coupling of this kind will allow transmission of increased torque at the beginning of the rotary movement of the coupled machine elements but the considerable lower torque fluctuations which will occur during the normal run of the machine will not be correctly compensated for.

An overload releasing clutch responsive to all operative conditions which will ever occur has to satisfy the following requirements:

(1) The coupling half connected with the machine to be protected must, when overload occurs, be separated from the coupling half fastened to the driving machine element, without any destruction or deterioration of coupling parts or parts connected therewith;

(2) When overload occurs, the machine to be protected, as well as the coupling half connected therewith, must be put out of operation, so that the workman of the machine is informed;

(3) After removal of the overload the overload releasing clutch must be immediately ready once more for operation, without the necessity of making use of any special expedient or auxiliary equipment.

According to the present invention the drawbacks of the known clutches of this kind are eliminated by an overload releasing clutch, comprising coupling halves rigidly secured on the ends of a driving rotating shaft and a driven rotating shaft with opposite face sides, radial guide grooves at the opposite spaced face sides of said coupling halves, flyweight bodies radially slidably disposed in said radial guide grooves, rigid engaging members on the flyweight bodies of one coupling half and movable engaging members on the flyweight bodies of the opposite coupling half axially projecting into the space between the opposite face sides of said coupling halves for mutual interengaging contacting action in a circumferential direction, radially acting resilient means for yieldingly urging said flyweight bodies of both coupling halves toward their inward end position in said radial guide grooves, abutment means on each of said rigidly engaging members of said one coupling half having at least two abutment surface portions oriented at different inclination angles with respect to the radial direction for engaging said movable engaging members on said opposite coupling half, an abutment surface portion defining a smaller inclination angle with respect to the radial direction being adapted to cooperate with the movable engaging members at the beginning of the rotating movement of the coupled shafts when the engaging members are in their inward end position, and another abutment surface portion defining a larger inclination angle with respect to the radial direction being adapted to cooperate with the movable engaging members of said opposite coupling half during the rotating movement of the coupled shafts when the engaging members are in their outward end position.

In the drawings are schematically represented some embodiments of the invention.

Figure 3:
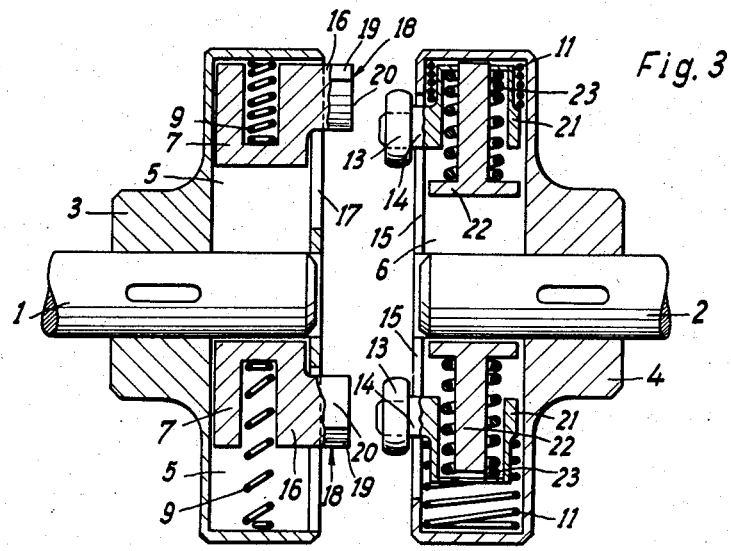
Figure 2:
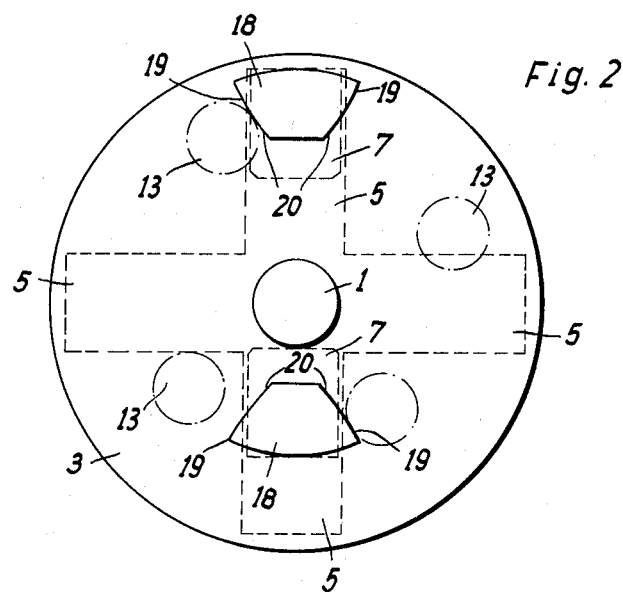
Figure 4:
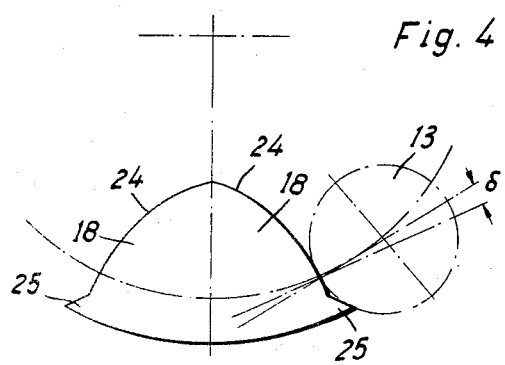

Figure 1 shows in longitudinal middle section an embodiment of the overload releasing clutch applied to two endwise opposed shaft ends, which for the purpose of better illustration have been represented in separated position, Figure 2 is a front view of the left-hand coupling half with the rigid engaging member, the movable engaging members of the other coupling half being indicated therein in dash-dot lines, Figure 3 shows in longitudinal middle section of another embodiment of the overload releasing clutch, Figure 4 shows in a larger scale a rigid engaging member having radial direction curved abutment and deflector faces and abutment noses at the outer ends thereof.

In Figures 1 and 2 the driving machine element in the form of shaft 1 and the driven machine element in the form of shaft 2 are arranged with their ends opposed and shown spaced apart for a better view of the several parts of the clutch. Rigidly secured to the ends of shafts 1 and 2 by means of keys or the like are flange-like coupling halves 3 and 4. Each is provided with radial grooves, slots or recesses 5 and 6, respectively, in which are located the radially movable flyweight bodies 7 and 8. Flyweight bodies 7 and 8 in their turn are biased to their inside radial end positions by means of radially acting springs 9 and 10, which return the bodies to their inside end positions when they are moved temporarily outwardly due to the centrifugal forces provoked by their own weights during rotation of the shafts. The flyweight bodies 8, which are radially movably mounted in the driven coupling half 4, carry movable engaging members in the form of rotatable rollers 13 running on axial pivots 14 protruding into the space between the end faces of the flange-like coupling halves 3 and 4 through radial slots 15.

The flyweight bodies 7 are radially movably mounted in coupling half 3 and have axially extending parts 16 which protrude into the space between coupling halves 3 and 4 through radial slots 17. Axially extending parts 16 carry rigid engaging members 18 having abutment and contacting faces 19 and 20 which are each oriented to present different inclination angles to the radial direction for cooperative engagement with rollers 13.

In the lower halves of Figures 1, 2 and 3, the respective inner end positions of the flyweight bodies 7 and 8 are shown in the inner or stop position and, in the upper halves of Figures 1, 2, and 3, the respective outer end positions of flyweight bodies are shown in the non-overload operating position.

The embodiment of Figures 1 and 2 show abutment faces 19 and 20 which are inclined to each other at a certain angle. Thus, different angles of inclination $\delta$ between the respective normals to the abutment faces and the circumference of rollers 13 at their contact points with the abutment faces are formed when the rollers are in contact with engaging members 18 at abutment faces 19 from the angles $\delta$ formed when rollers 13 are in contact at abutment faces 20.

Springs 9 and 10 are designed for constant speed operation so that they will yield to the urging of flyweight bodies 7 and 8, when the flyweight bodies are subjected to centrifugal forces of rotation, to allow the flyweight bodies to move radially outward to their extreme outer positions when the flyweight bodies are subjected to the centrifugal forces attained at the operational speed of rotation. Thus, for a constant driving speed the following relationship exists between the centrifugal forces, the forces of spring action, the maximum torque to be transmitted and the angles of inclination $\delta$, the angles between the normal two abutment faces 19 and 20, respectively, and to the circumference of rollers 13 at their contact points with abutment faces 19 and 20, respectively (friction being negligible):

$$\text{Centrifugal force } F_{f1} = f(n,r,m) = \text{constant} \quad (1)$$

wherein: $n$=operational speed in r.p.m.; $r$=radial distance of the center of gravity of the flyweight body from the axis of rotation of the respective coupling half; $m$=mass of all flyweights in the driven coupling part 4.

$$\text{Centripetal force } F_z = F_u \cdot \tan \delta + F_F \quad (2)$$

wherein: $F_u$=peripheral force at the point of contact of the engaging members; $\delta$=angle of inclination between the normal of the respective abutment face at the point of contact and a tangent drawn through the point of contact to a circle whose periphery traverses the point of contact between the abutment face and the roller and whose center is in the axis of rotation of the coupling half; $F_F$=forces of spring action.

The operating condition without overload is governed therefore by the equation $$F_{f1} - F_z \geq 0 \quad (3)$$

In the operating condition with overload, the flyweight bodies of the coupling half 4 are driven inwardly due to centripetal force which increases proportionally with the increasing torque, a condition which is expressed by the equation $$F_{f1} < F_z \quad (3a)$$

In the embodiment shown in Figure 3, the two flyweight bodies in the driven coupling half 4 are each subdivided into flyweight bodies 21 and the additional cooperating flyweight bodies 22. Flyweight bodies 21 serve as carriers for rollers 13 and are urged inwardly by radially acting recoil springs 11. Flyweight bodies 22 are axially slidably mounted within flyweight bodies 21 and are biased radially inwardly by springs 23.

In Figure 4 the abutment or deflector faces of the rigid engaging members 18 have been shaped as curved faces 24, which have at their outer extremities rising abutment noses 25 adapted to engage rollers 13 to limit their outward radial movement beyond engaging members 18.

If the rotational speed of the shafts cannot be kept constant within certain limits, $F_{f1}$ will be variable. In spite of this, the operating condition of the embodiments shown in Figure 3 may be described, as was done above for the embodiment in Figure 1, in the following manner:

$$F_{F2}' - F_{F2} \geq F_z \quad (4)$$

and for the overload condition $$F_{F2}' - F_{F2} < F_z \quad (4a)$$

wherein $F_{F2}$ is the force of the recoil spring 11 and $F_{F2}'$ is the force of the biased spring 23 in Figure 3 when flyweight bodies 21 and 22 in coupling half are in their extreme outer positions. Thus, in this embodiment, for a non-constant speed, $F_z$ will depend subsbtantially upon the force of spring 23, unless the operating speed falls below a minimum value for which the couple is designed. Since the roller 13 cannot be made without any mass and on the other hand the main flyweight body 22 cannot be unlimited as to its mass, it is inevitable that the releasing torque will still depend to a small degree on the speed of rotation, but this dependence may be kept quite low in actual practice.

The function of the overload releasing clutch is as follows: When the shafts 1 and 2 with their flange-like coupling halves 3 and 4, respectively, are at rest, the flyweight bodies 7 and 8, respectively, in both coupling halves 3 and 4, respectively, are biased by their recoil springs 9 and 10, respectively, to their innermost position adjacent shafts 1 and 2, respectively, and the rigid engaging members 18 with their abutment faces 19 and 20 are likewise biased to their innermost positions where they are circumferentially interposed between the two rollers 13 on the driven coupling half 4. When the driving shaft 1 begins turning, the abutment faces 19 and 20 of the engaging members 7 will engage the rollers 13 of the coupling half 4 and thus rotate the driven shaft 2. At the same time the flyweight bodies 7 and 8 in the coupling halves 3 and 4, respectively, due to the centrifugal forces caused by their own weight, will be moved outwardly contrary to the forces of the recoil springs 9 and 10, respectively. In the disclosed embodiment, the compressive strength of the various springs 9, 10 and 11 are related to the weights of the flyweight structure 7 and 8 and 21–23 in a manner to insure that the abutment faces and rollers will move radially outwardly together maintaining operative engagement during normal acceleration of the drive shafts.

Various specific operative relationships for carrying out the above purpose will be readily apparent to those familiar with this class of devices. For instance, in a general illustration: if flyweights 7 are selected of lesser weight than flyweights 8 or 21–23, and springs 9 have an equal or greater compressive strength than the springs 10 or 11, the centrifugal force of the heavier flyweights 8 will tend to move the weights 8 and the rollers 13 radially outwardly more rapidly (in relation to increasing rotational speed of the shafts) than the corresponding radial movement of flyweights 7. Thus the rollers 13 will be urged radially outwardly against the inclined surfaces of the extension 16 at all times during the speed-up phase. The exact spring-tension-weight balance of the units, or some suitable positive stop means such as abutment noses 25, insures maintenance of the above radial engagement by preventing overriding of the extensions 16 by the rollers 13.

When the flyweight bodies 7 and 8 are in their outer end position, the desired peripheral force can be transmitted from the driving half to the driven half at a given speed, provided the masses of the flyweight bodies 7 and 8 as well as the angles of inclination δ between the normal of the abutment faces at the point of contact between abutment face and roller and a tangent drawn through the point of contact to a circle whose periphery traverses that contact point and whose center is the axis of rotation of the coupling half have been properly selected. As soon as this peripheral force is exceeded the rollers 13 will move radially along the radially inclined abutment faces 19 and 20 of the engaging member 7 inwardly and eventually will pass beyond faces 20 completely to disengage. Thus, the power transmission from the driving shaft 1 to the driven shaft 2 is interrupted and the driven shaft will stop after a short time. The flyweight bodies 8 with their rollers 13 are once more in their extreme inner positions, whereas the driving shaft 1, which is turning now without any load, will have their flyweight bodies 7 with the respective abutment faces 19 and 20 in their outer extreme position. Upon removal of the overload and stopping of the driving shaft 1, whereby the engaging members 7 in the driving coupling half 3 will once more occupy their positions between the rollers 13 of the engaging members 8 of the driven coupling half 4, the coupling is connected once more and the cycle will begin anew, i.e. the flyweight bodies 7 and 8 in both coupling halves 3 and 4, respectively, will move together outwardly and will remain in that outward position until new overloading occurs.

Upon initiation of rotation of the coupled shafts, the coupling is generally subjected to a short period of heavy overload. In order to prevent disengaging action of the coupling in the above described manner for this starting torque, the abutment faces 19 and 20 of the driving engaging members 7 are inclined to each other at a certain angle, so that their angles δ (formed between the normal of the abutment face at the contact point with the roller and the tangent through the contact point to a circle whose periphery traverses the abutment face at the same contact point and whose center is in the axis of rotation of the coupling half) will be different. Abutment faces 19 and 20 are designed so that the angle δ formed when rollers 13 abut faces 19 when flyweights 7 and 8 are in their extreme inner positions (the at rest position) so that the centripetal component of the peripheral force as a function of the inclination of the abutment face 19 of the engaging members 7 and the force exerted by that abutment face upon the rollers 13 will not exceed the centrifugal force caused by the flyweight bodies 8 and the rollers 13. Thus, as illustrated by the upper and lower portions of Figure 2, the abutment faces 19 and 20 have been positioned in radial direction with respect to the corresponding opposed rollers cooperating therewith in such a manner that the driving force is transmitted to the rollers 13 of the engaging members 8 through the abutment face 19 (having a smaller angle of inclination δ) during the initiation of rotation of the coupled shafts. Upon rotation of the coupling, the flyweights 7 and 8 will move outwardly together to their extreme outermost positions where rollers 13 abut faces 20 which are designed to give a larger angle of inclination δ for transmitting a greater proportion of the driving force to rollers 13 in a centripetal direction.

This transition occurs, in the disclosed embodiment, in the following manner: The flyweights 7 and 8 or 21–23 move outwardly together with the rollers 13 in contact with the abutment surface 19. In this relative position, the radially outermost edge of flyweight structures 8 or 21–23, respectively, project radially beyond the corresponding edge of flyweights 7; see the lower portion of Figures 1 and 3. Thus, flyweights 8 or 21–23, respectively, reach their end limit of travel, engaging the outer end walls of the radial grooves 6, before flyweights 7 engage the outer end walls of radial grooves 5. Flyweights 7 then continue moving radially outwardly until they engage the outer end wall of grooves 5, thus moving abutment surfaces 19 and 20 radially outward relative to rollers 13 and placing abutment surfaces 20 in contact with the rollers. It is not necessary that the two abutment faces 19 and 20 should form a sharp edge at their joining point. Both abutment faces 19 and 20 might be replaced by a single curved face 24, where the angle of inclination as defined in the preceding paragraphs will increase, if the curve is approaching the axis of rotation of the coupling half 3 (Figure 4). In order to limit the outwardly directed engaging movement between the engaging members 7 and 8 each of the outer abutment faces 20 or the curved faces 24 at the engaging members 7 have been provided with a projecting abutment nose 25.

Both the abutment surface engaging members and the roller engaging members may be also interchanged with repect to their disposal at the coupling halves 3 and 4; the requirement of interrupting the transmission of power can be attained then by the arrangement of constructional means at the driven coupling half 4. It is, furthermore, possible to vary the design of the releasing clutch by incorporating flexible transmission members, so that it might be additionally used as a yieldable starting coupling.

What I claim is:

1. An overload releasing clutch between opposite facing ends of a driving rotating shaft and a driven rotating shaft, comprising coupling halves rigidly secured on said shaft ends with opposite spaced face sides, radial guide grooves at the opposite spaced face sides of said coupling halves, flyweight bodies radially slidably disposed in said radial guide grooves, rigidly engaging members on the flyweight bodies of one coupling half and movable engaging members on the flyweight bodies of the opposite coupling half axially projecting into the space between the opposite face sides of said coupling halves for mutual interengaging contacting action in a circumferential direction, radially acting resilient means for yieldingly urging said flyweight bodies of both coupling halves toward their inward end position in said radial guide grooves, abutment means on each of said rigidly engaging members of said one coupling half having at least two abutment surface portions oriented at different inclination angles with respect to the radial direction for engaging said movable engaging members on said opposite coupling half, an abutment surface portion defining a smaller inclination angle with respect to the radial direction being adapted to cooperate with the movable engaging members at the beginning of the rotating movement of the coupled shafts when the engaging members are in their inward end position, and another abutment surface portion defining a larger inclination angle with respect to the radial direction being adapted to cooperate with the movable engaging members of said opposite coupling half during the rotating movement of the coupled shafts when the engaging members are in their outward end position.

2. An overload releasing clutch as in claim 1 and wherein said movable engaging members comprise rollers.

3. An overload releasing clutch between opposite facing ends of a driving rotating shaft and a driven rotating shaft, comprising coupling halves rigidly secured on said shaftends with opposite spaced face sides, radial guide grooves at the opposite spaced face sides of said coupling halves, flyweight bodies radially slidably disposed in said radial guide grooves, rigidly engaging members on the flyweight bodies of one coupling half and movable engaging members on the flyweight bodies of the opposite coupling half axially projecting into the space between the opposite face sides of said coupling halves for mutual interengaging contacting action in a circumferential direction, the radial movement range of the radially movable flyweights with the rigidly engaging members in the respective guide grooves of one coupling half being of larger length than the radial movement range of the radially movable flyweights with the movable engaging members in the guide grooves of the other coupling half, radially acting resilient means for yieldingly urging said flyweight bodies of both coupling halves toward their inward end position in said radial guide grooves when said shafts are at rest and permitting radial movement of said flyweight bodies of both coupling halves to their outer end positions by the centrifugal force of said flyweights when said shafts are rotated, abutment means on each of said rigidly engaging members of said one coupling half having at least two abutment surface portions oriented at different inclination angles with respect to the radial direction for engaging said movable engaging members, the abutment surface portion defining the smaller inclination angle with respect to the radial direction disposed to cooperate with the movable engaging members at the beginning of the rotating movement of the coupled shafts when the engaging members are in their inward end position, and another abutment surface portion defining a larger inclination angle with respect to the radial direction disposed to cooperate with the movable engaging members during the rotating movement of the coupled shafts when the engaging members are in their outward end position.

4. An overload releasing clutch between opposite facing ends of a driving rotating shaft and a driven rotating shaft, comprising coupling halves rigidly secured on said shaftends with opposite spaced face sides, radial guide grooves at the opposite spaced face sides of said coupling halves, flyweight bodies radially slidably disposed in said radial guide grooves, rigid engaging members on the flyweight bodies of one coupling half and movable engaging members on the flyweight bodies of the opposite coupling half axially projecting into the space between the opposite face sides of said coupling halves for mutual interengaging contacting action in a circumferential direction, the radial movement range of the radially movable flyweights with the rigidly engaging members in the respective guide grooves of one coupling half being of larger length than the radial movement range of the radially movable flyweights with the movable engaging member in the guide grooves of the other coupling half, radially acting resilient means for yieldingly urging said flyweight bodies of both coupling halves toward their inward end position in said radial guide grooves, abutment means on each of said rigid engaging members of said one coupling half including a curved abutment and deflector surface disposed to define a decreasing inclination angle with respect to the radial direction decreasing toward the radially outwardly disposed portion of said surface, the radially outer portion of the abutment surface being disposed to engage an opposite movable engaging member at the beginning of the rotating movement of the coupled shafts when the engaging members are in their inward end position, and the radially inner portion of the abutment surface being disposed to engage said opposite movable engaging member during the rotating movement of the coupled shafts when the engaging members are in their outward end position.

5. An overload releasing clutch as in claim 4 and wherein each of said rigid engaging members of said one coupling half includes an abutment nose disposed at the radially outer extremity of said abutment surface and projecting above said abutment surface as a stop for the outward radial movement of said movable engaging members.

6. An overload releasing clutch between opposite facing ends of a driving rotating shaft and a driven rotating shaft, comprising coupling halves rigidly secured on said shaftends with opposite spaced face sides, radial guide grooves at the opposite spaced face sides of said coupling halves, flyweight bodies radially slidably disposed in said radial guide grooves, rigid engaging members on the flyweight bodies of one coupling half and movable engaging members on the flyweight bodies of the opposite coupling half axially projecting into the space between the opposite face sides of said coupling halves for mutual interengaging contacting action in a circumferential direction, the radial movement range of the radially movable flyweights with the rigid engaging members in the respective guide grooves of said one coupling half being of larger length than the radial movement range of the radially movable flyweights with the movable engaging members in the guide grooves of said other coupling half, radially acting resilient means for yieldingly urging said flyweight bodies of both coupling halves toward their inward end position in said radial guide grooves, a supplemental inner flyweight body in interengaging connection with each of said flyweight bodies of said movable engaging members, and a radially acting spring disposed between each of said supplemental flyweight bodies and the respective flyweight body of said movable engaging member, said radially acting springs being of considerably larger tension force than said resilient means, abutment means on each of said rigidly engaging members having at least two abutment surface portions for engaging said movable engaging members, said abutment surface portions disposed at different inclination angles with respect to the radial direction, the abutment surface portion defining the smaller inclination angle with respect to the radial direction disposed to cooperate with the movable engaging members at the beginning of the rotating movement of the coupled shafts when the engaging members are in their inward end position, and another abutment surface portion defining a larger inclination angle with respect to the radial direction being adapted to cooperate with the movable engaging members during the rotating movement of the coupled shafts when the engaging members are in their outward end position.

7. An overload releasing clutch as in claim 1, and wherein each of said flyweight bodies disposed in one of said coupling halves comprises an inner portion and an outer portion, both portions being disposed in interengaging connection in one of said radial grooves, said inner portion being of considerably larger weight than said outer portion, and a radially acting spring having considerably larger tension force than said resilient means mounted between said outer and said inner portions in each flyweight body and disposed to urge the outer flyweight body portion in a radially outward direction relative to said inner portion, and contacting means whereby said inner portion seats directly against said one coupling half permitting radial movement of said outer portion relative thereto when said flyweight bodies are in their outward end positions; and wherein the engaging member on each of said flyweight bodies having inner and outer portions is mounted on said outer portion.

References Cited in the file of this patent

UNITED STATES PATENTS

| 2,253,466 | Grohn | Aug. 19, 1941 |
| 2,514,228 | Dodge | July 4, 1950 |
| 2,546,633 | Dodge | Mar. 27, 1951 |